United States Patent [19]
Bergmann et al.

[11] Patent Number: 5,746,438
[45] Date of Patent: May 5, 1998

[54] FIFTH WHEEL

[75] Inventors: Wolfgang Bergmann, Hosbach; Hans Dreyer, Egelsbach; Wolfgang Pohl, Dreieich, all of Germany

[73] Assignee: Jost—Werke AG, Frankfurt am Main, Germany

[21] Appl. No.: 398,514

[22] Filed: Mar. 3, 1995

[51] Int. Cl.$^6$ .................................................. G62D 53/08
[52] U.S. Cl. ............................................. 280/433; 384/421
[58] Field of Search .............................. 280/433, 441.1, 280/439; 384/421, 422

[56] References Cited

U.S. PATENT DOCUMENTS

| | | | |
|---|---|---|---|
| 2,960,352 | 11/1960 | Wood | 280/433 |
| 3,174,812 | 3/1965 | Widmer | 308/136 |
| 3,275,390 | 9/1966 | Franks | 308/136 |
| 3,337,277 | 8/1967 | Arnold | 308/136 |
| 3,451,731 | 6/1969 | Weichsel | 308/9 |
| 3,534,982 | 10/1970 | Mathers | 208/435 |
| 3,704,924 | 12/1972 | Loury | 308/136 |
| 3,924,909 | 12/1975 | Kent et al. | 308/136 |
| 3,944,298 | 3/1976 | Cannon | 384/422 |
| 4,121,853 | 10/1978 | McKay | 280/433 |
| 4,169,635 | 10/1979 | Szalay et al. | 308/136 |
| 4,542,912 | 9/1985 | Louis | 280/433 |
| 4,752,081 | 6/1988 | Reeners et al. | 280/433 |
| 4,805,926 | 2/1989 | Mamery | 280/433 |
| 4,946,184 | 8/1990 | Larocco | 280/433 |
| 5,165,714 | 11/1992 | Kaim | 280/433 |
| 5,263,856 | 11/1993 | Huehn et al. | 280/433 |
| 5,482,308 | 1/1996 | Marcu | 280/433 |
| 5,522,613 | 6/1996 | Heeb | 280/433 |

FOREIGN PATENT DOCUMENTS

| | | |
|---|---|---|
| 0058732 | 10/1984 | European Pat. Off. . |
| 0224197 | 11/1986 | European Pat. Off. . |
| 0380718 | 1/1989 | European Pat. Off. . |
| 0616939 | 9/1994 | European Pat. Off. ......... 280/433 |
| 3518540 | 11/1986 | Germany . |
| 3530467 | 3/1987 | Germany ......................... 280/433 |
| 3741330 | 6/1989 | Germany . |

*Primary Examiner*—Anne Marie Boehler
*Attorney, Agent, or Firm*—Sand & Sebolt

[57] ABSTRACT

A fifth wheel includes a coupling plate formed with an insertion slot for receiving a trailer king pin. The insertion slot is provided with a central aperture sized to receive the king pin and formed with a counterbored step. A non-metallic wear ring is fitted within the aperture and is retained against axial displacement with an arcuate metal holding plate mounted within the counterbored step, and partially overlapping the wear ring. The wear ring includes an outer contour wall and an inner contour wall. The outer contour wall and the inner surface of the aperture share a common center of curvature, which center of curvature is eccentric relative to the axis of rotation of the king pin mounted therein such that any rotational force resulting from the rotation of the king pin translates linearly into the wear ring. Additionally, the inner contour of the wear ring has a center of curvature axially aligned with the axis of rotation of the king pin to reduce the frictional engagement between the wear ring and the king pin. Additionally, a pair of slip pads are positioned within recesses formed on the top surface of the coupling plate. Each recess is somewhat larger than the slip pads to provide for thermal expansion, but remains relatively close in size to the slip pads to prevent lateral displacement thereof. In order to reduce fracture as a result of the king pin contacting the slip pads, the slip pads do not extend downwardly over the inclined surface of the coupling plate.

17 Claims, 4 Drawing Sheets

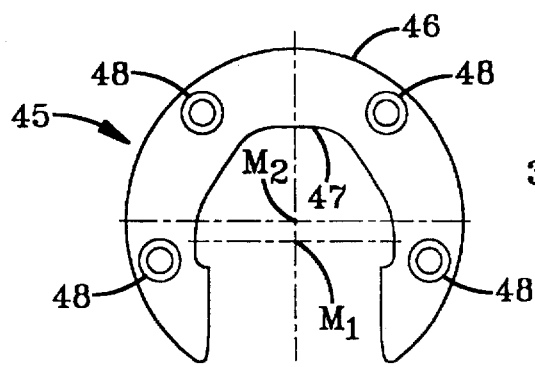
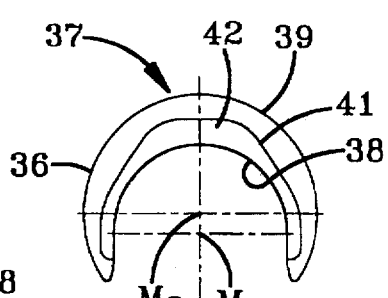
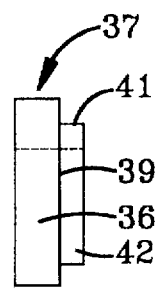
FIG-5   FIG-6   FIG-7
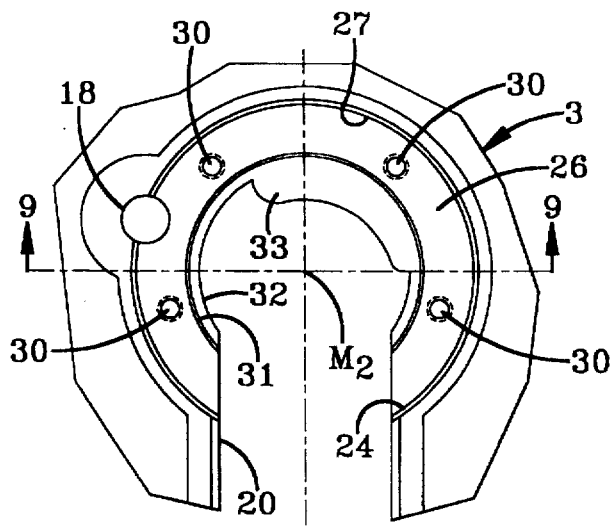
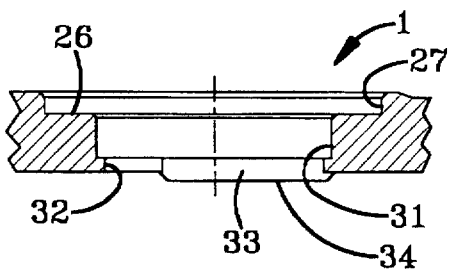
FIG-8   FIG-9
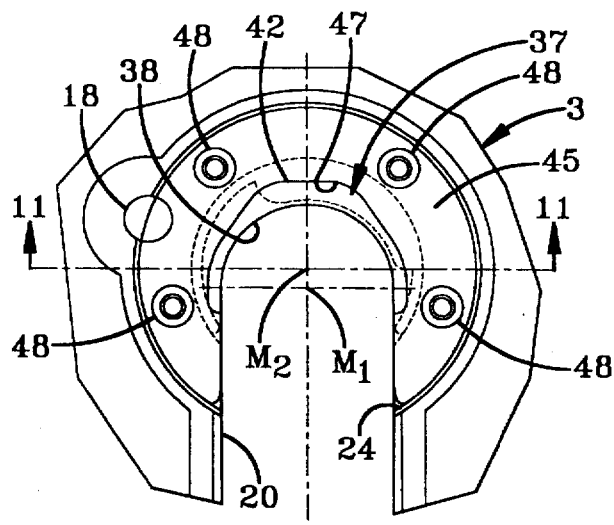
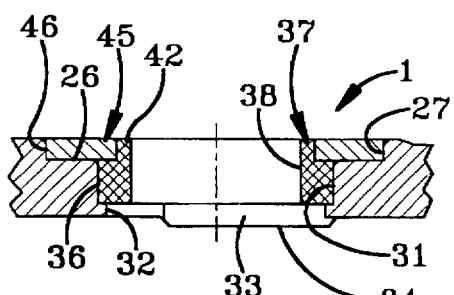
FIG-10   FIG-11

FIFTH WHEEL

BACKGROUND OF THE INVENTION

1. Technical Field

The invention relates generally to an improved coupling device. More particularly, the invention relates to an improved device for coupling a trailer to a tow vehicle. Specifically, the invention relates to a fifth wheel for use with tractor trailer combinations which is adapted to substantially reduce friction between the coupled tractor and trailer.

2. Background Information

The trucking industry utilizes motorized transport vehicles for hauling freight. These vehicles frequently include a motorized tractor with one or more trailers in a tracking position behind the tractor. As with most capital equipment, optimal economic benefit from the tractor and trailer is realized by maximum or continuous usage of the equipment. However, tractor trailer combinations require substantial maintenance to sustain a peak operating condition.

The device utilized to couple the tractor to the trailer is commonly referred to as a fifth wheel and is a high maintenance item. The fifth wheel permits the tractor to be releasably coupled to the trailer and is formed with a substantially round flat coupling plate positioned in the horizontal plane to form a bearing surface with two flanges sloped downwardly toward the rear of the tractor. Another coupling plate having a downwardly extending king pin is attached to the front end of the trailer. The coupling plate attached to the trailer provides a bearing surface which operatively engages the coupling plate of the fifth wheel such that the opposing coupling plates interact along a planar surface with trailer loads being transmitted through the interacting coupling plates to be supported by the tractor vehicle. An opening is provided intermediate the two sloped flanges of the fifth wheel which receives the trailer king pin. The two vehicles are thus mechanically joined such that the tractor may pull the trailer while permitting the desired relative rotational movement therebetween via rotation about the king pin.

The tractor and trailer of a fifth wheel combination are in constant rotational movement relative to each other as a result of changes in terrain, and in direction of travel of the tractor vehicle. When friction exists between the trailer coupling plates, increased break away friction may create difficult steering conditions. Specifically, when the tractor trailer combination travels at highway speeds, the force required to overcome static friction between the trailer coupling plate and the tractor coupling plate increases as the friction between the respective coupling plates increases. As a truck with a high break away friction moves into a turn, steering tires deflect laterally during the steering maneuver with deflection and relative force increasing in proportion to the fifth wheel friction. As the static friction breaks loose, such that the tractor will rotate relative to the trailer, the laterally deflected tires rebound requiring an immediate steering compensation. The need for counteracting steering results in trailer swing and vehicle yaw.

Additionally, the coupling plate surfaces are susceptible to abrasion from metal to metal contact, as well as from dirt and particulates trapped between the mating coupling plates.

As such, the need exists for a device for reducing friction between the trailer coupling plate, and a fifth wheel coupling plate attached to the tractor.

One method of reducing the friction between the coupling plates is to interpose a layer of grease between the coupling plates. However, rotational and translational movement between the tractor and trailer causes the grease to be squeezed out such that the coupling plates are once again in metal to metal contact. Thus, because of the long hours of use and the rather rapid dissipation of lubricant, frequent disconnection of the trailer from the tractor for reapplication of the grease is required in order to maintain the equipment in optimum working condition. Since nearly continuous operation is economically desirable and since the task is onerous and time consuming, such maintenance is often not performed as frequently as would be desirable. The result is aggravated wearing of the bearing surfaces and progressively worse handling characteristic for the tractor trailer combination.

Additionally, the grease layer on the fifth wheel coupling plate captures particulate matter, which may act as an abrasive, causing rapid wear and abrasion, and thus a higher repair and replacement rate of the tractor and trailer coupling plates.

As noted, maximum economic benefit of a tractor trailer combination is derived by nearly continuous utilization of the equipment. However, continuous use of the tractor requires an active maintenance program to sustain the tractor in operative condition. This maintenance program includes removing the grease layer on the fifth wheel bearing surface along with the entrained grit and particulates. Cleaning the fifth wheel coupling plate of the grease and particulate matter is usually accomplished by high pressure steam or application of organic solvents. This flushes the grease into a sewer system which enters into a water way, or onto the ground where it is considered an undesirable environmental element as it may leach into, and contaminate, and aquifer.

The necessity or benefit of a lubricating barrier between the opposing coupling plate is so readily apparent that manufacturers provide automatic greasing systems and grease grooves in the tractor coupling plate in an attempt to maintain at least a minimum grease bearer at this interface. However, providing a fresh grease layer or grease addition without removing the extant contaminated grease is not adequate to provide the requisite lubrication for coupling plates.

The desire to overcome or replace the use of grease on the coupling plates has been encouraged by both national and international Environmental Protection Agencies and their affiliated regulatory agencies for the handling and disposal of such materials. Consequently, the trucking industry is continuously seeking environmentally acceptable means to overcome wear, erosion and abrasion between the coupling plates while continuing to provide an adequate lubricant area between these frictionally engaged surfaces. The acceptable lubricant must consider the longitudinal, transverse and pitching motions of the tractor and trailer during transport.

Earlier efforts to overcome the utilization of grease between the opposed and contacting coupling plates incorporated a liner of low frictional material positioned on the fifth wheel or trailer coupling plate to obviate the requirement for thoroughly greasing the surfaces of the coupling plates. These earlier low friction materials between opposing coupling plates were generally soft, easily damaged or scuffed and consequently, have an inherently short useful life span.

U.S. Pat. No. 3,275,390 discloses securement of a self lubricating material which may be polyethylene or polypropylene to a trailer body by means of a self locking retainer ring. One problem with such construction is the risk of the ring breaking and causing dangerous conditions on the road.

U.S. Pat. No. 4,752,081 is directed to a low friction two part plastic covering on a fifth wheel. However, a pair of metal bars extend upwardly through the plastic covering, and the plastic covering extends over the fifth wheel flanges such that coupling would likely cause damage to the fifth wheel coupling plate. Additionally, inasmuch as the plastic plate is mounted on top of the fifth wheel coupling plate, it is subject to deflection and fracture as a result of rotational, translational and longitudinal forces.

While the above discussed references are presumably adequate for the purpose for which they are intended, inasmuch as slip pads are generally manufactured of plastics or polymers, they are subject to relatively large volumetric variances as a result of exposure to intense sunlight. The above referenced designs, given that they are either attached to the coupling plate at a significant number of locations, or alternatively cover the entire plate, do not provide for sufficient movement of the slip pad, such that the slip pads are susceptible to breaking as a result of the strains imparted in the slip pad from heating and cooling.

Similarly, inasmuch as the king pin couples directly with the fifth wheel, rotational, translation and longitudinal forces acting on the king pin as a result of movement between the tractor and trailer will substantially reduce the life of the king pin and trailer absent sufficient lubrication. While grease has been added to the king pin connection, the problems associated with the use of grease as discussed above, are similarly problematic when used to protect the king pin and fifth wheel from metal to metal contact.

A number of prior art devices have been utilized to overcome the friction, and increased wear associated with king pin and fifth wheel interaction. In one known trailer coupling plate, German patent application DE 37 41 330 A1, a wear ring is provided with holes for the insertion of attachment screws. This type of affixation carries the risk that the plastic of the wear ring in the course of time will yield under the tensile force of the tension screws and that the screws will loosen. Although the plastic of the wear ring is capable of sliding, nevertheless the rotational stresses of altering direction exercised by the king pin on the wear ring may nevertheless lead to the distortion or enlargement of the holes in the wear ring.

EP 0 224 197 B1 includes a similar trailer coupling in which the wear ring has a U-shaped cross section and in which the legs of the wear ring cross the inner edge of the step of the insertion slot. Additionally, the edge of the upper leg is provided with semi-circular recesses which accept the heads of screws in order to secure the wear ring against rotation. During assembly, the wear ring is pushed under the inner edge of the insertion slot while the ring is rotated. Thereafter, the screws are inserted. While the above referenced subject matter is presumably adequate for the purpose for which it was intended, the wear ring may distort because of movements of the king pin relative to the fifth wheel.

Therefore, a need exists for a fifth wheel which substantially reduces the friction between the trailer coupling plate and fifth wheel coupling plate, and between the fifth wheel and the king pin. Further, the need exists for a fifth wheel which includes a pair of slip pads mounted on the coupling plate which cover only the load receiving area of the fifth wheel while simultaneously being retained in recesses formed therein to prevent each slip pads movement as a result of rotational, translational or longitudinal movement of the trailer relative to the fifth wheel.

Still further, the need exists for a fifth wheel wherein there is sufficient room between the respective slip pads to allow the slip pads to expand and contract as a result of heat generated from movement of the respective trailer and tractor parts, and from exposure to intense sunlight.

SUMMARY OF THE INVENTION

Objectives of the invention include providing a fifth wheel having reduced frictional forces between the tractor and trailer coupling plates, and between the fifth wheel and the king pin.

Another objective of the invention is to provide a fifth wheel in which the wear ring is subject to minimal deformation.

Yet another objective of the invention is to provide a wear ring held securely in the step by a metal holding plate which partially overlaps the wear ring and is affixed radially outside of the wear ring to the trailer coupling plate, such that the outer contour of the wear ring and the contour of the surface of the step lying adjacent said contour are eccentric with respect to the center point of the inner contour of the wear ring.

Yet a further objective of the invention is to provide a wear ring in which the holding plate and wear ring are easily removable and replaceable.

Yet another objective of the invention is to provide a holding plate which is approximately horseshoe shape such that it covers a large surface area of the wear ring under the lowest possible pressure.

A still further objective of the invention is to provide a wear ring with an axially upwardly extending protrusion which is complementary to an inner perimeter of the holding plate to provide additional rotational security of the wear ring.

Still another objective of the invention is to provide area between the holding plate and the wear ring to provide for axial movement between the holding plate and the wear ring for thermal expansion of the wear ring in the axial direction as a result to the variable expansion coefficient of metal and plastic and to prevent an axial load on the wear ring by the holding plate.

A still further objective is to provide a fifth wheel in which a pair of slip pads are accepted within recesses formed on the top surface of the fifth wheel coupling plate such that the edge walls of the recesses retain the slip pads against movement as a result of rotational, translational and longitudinal forces.

A still further objective is to provide a fifth wheel in which the slip pads do not extend to the inclined flanges such that upon coupling the tractor to the trailer, the slip pads will not be damaged via accidental contact with the king pin.

Yet another objective is to provide a fifth wheel with recesses formed therein, which recesses are larger than the slip pads due to the variable thermal expansion coefficient of metal and plastic, and to prevent the accumulations of stresses within the slip pads.

Yet another objective of the invention is to provide such a fifth wheel which is of simple construction, which achieves the stated objectives in a simple, effective and inexpensive manner, and which solves problems and satisfies needs existing in the art.

These and other objectives and advantages of the invention are obtained by the improved slip pad, the general nature of which may be stated as including a saddle; a coupling plate formed with a pair of flanges, and an insertion slot extending between said flanges mounted to the saddle; an aperture having an inner surface, operatively associated with the insertion slot and adapted to receive a king pin; a non-metallic wear ring carried in the aperture and adapted to extend adjacent a trailer king pin and formed with an inner contour wall and an outer contour wall whereby the outer contour wall is complementary related to the inner surface of the aperture with said outer contour wall having a first center of curvature, and the inner contour wall having a second center of curvature offset from the first center of curvature for at least partially preventing the ring from rotating; a holding plate attached to the coupling plate and extending at least partially over the wear ring for retaining the wear ring against axial displacement; and fastening means for retaining the holding plate to the coupling plate.

These and other objectives and advantages of the invention are still further obtained by the improved slip pad, the general nature of which may be stated as including a saddle; a coupling plate formed with a pair of flanges, and an insertion slot extending between said flanges mounted to the saddle; an aperture having an inner surface, operatively associated with the insertion slot adapted to receive a king pin; a plurality of arcuate recesses formed in the coupling plate whereby the arcuate recesses substantially correspond to a load bearing zone on said coupling plate; a non-metallic slip pad positioned within each arcuate recess whereby each arcuate recess extends beyond the associated slip pad for providing an area for thermal expansion; and fastening means for fastening the slip pad within the recesses.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 5 is a top plan view of the holding plate;

FIG. 6 is a top plan view of the wear ring;

FIG. 7 is a side elevational view of the wear ring;

FIG. 8 is a fragmentary top plan view of the fifth wheel with the wear ring and holding plate removed;

FIG. 9 is a sectional view taken substantially along line 9—9, FIG. 8;

FIG. 10 is a fragmentary top plan view of the trailer coupling plate with the wear ring and holding plate installed; and FIG. 11 is a sectional view taken substantially along line 11—11, FIG. 10.

Similar numerals refer to similar parts throughout the drawings.

DESCRIPTION OF THE PREFERRED EMBODIMENT

Figure 1:
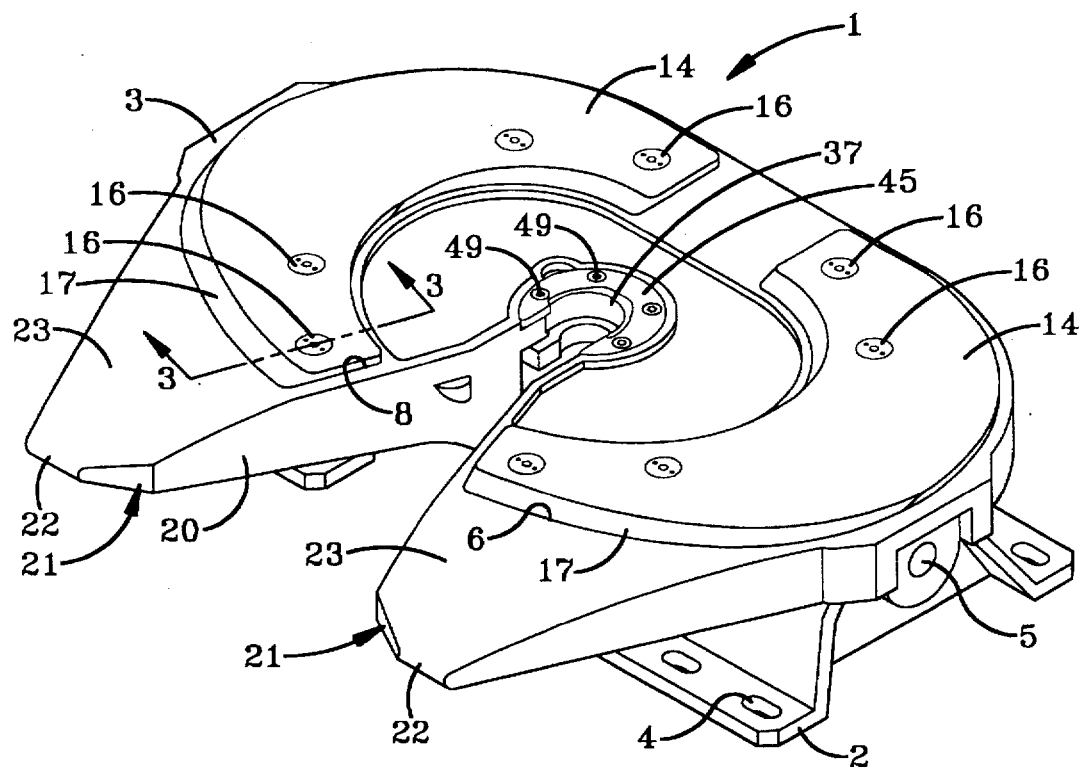
FIG. 1 is a perspective view of the fifth wheel of the present invention.
Figure 3:
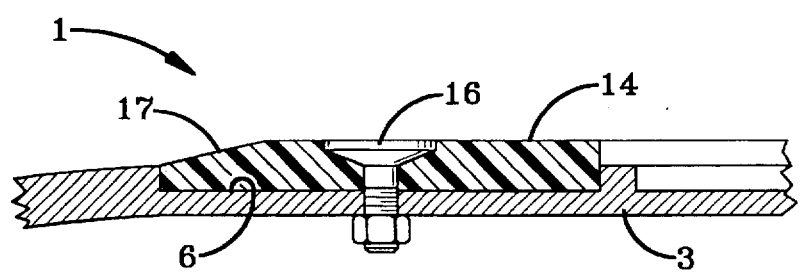
FIG. 3 is a sectional view taken along line 3—3, FIG. 1.
Figure 2:
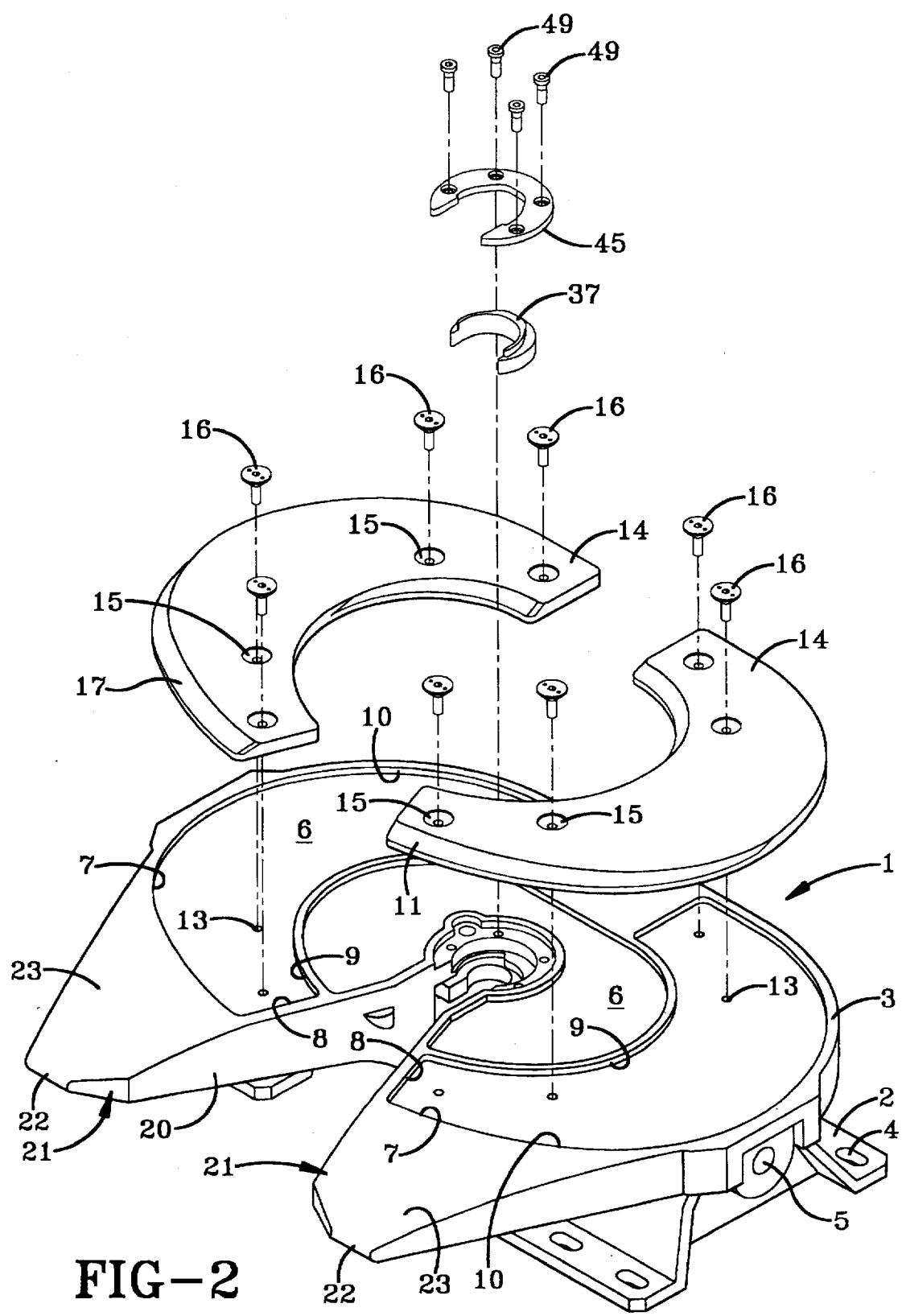
FIG. 2 is an exploded perspective view of the fifth wheel of the present invention shown in FIG. 1.

The improved fifth wheel of the present invention is indicated generally at 1, and is particularly shown in FIGS. 1 and 2. Fifth wheel 1 includes a saddle 2, and a coupling plate 3. Saddle 2 is formed with a plurality of holes 4 for receiving bolts to mount the same to the rear of a tractor vehicle (not shown). Coupling plate 3 is rotatably mounted on saddle 2 via a pair of pivot pins 5 (one shown). Coupling plate 3 is provided with a pair of opposing semi-circular, arcuate recesses 6, with each recess having a perimeter wall 7 (FIG. 2). Perimeter wall 7 is formed from a pair of flat end walls 8, an inner arcuate semi-circular wall 9, and an outer semi-circular wall 10. Four holes 13 extend through coupling plate 3 within each semi-circular arcuate recess 6. Holes 13 are offset relative to the axis of pivot pins 5, and are positioned relatively close to ends 8.

In accordance with one of the main features of the present invention, a pair of arcuate semi-circular slip pads 14 are formed with a plurality of counterbored holes 15. Each slip pad 14 is complementary related to a respective recess 6. However, each recess 6 is somewhat larger than the respective slip pad 14 to provide for thermal expansion of slip pads 14 relative to coupling plate 3. In the preferred embodiment, recess 6 is between ⅛ inch and 5/16 inch larger than corresponding slip pads 14. When slip pads 14 are positioned within recesses 6, counterbored holes 15 and holes 13 are axially aligned and sized to receive a mounting pin 16.

Additionally, each slip pad 14 is provided with a leading chamfered edge 17 which flushly adjoins the top surface of coupling plate 3 (FIG. 1) for purposes which will be described in detail hereinbelow. While slip pads 14 may be manufactured from a variety of materials, preferably they are manufactured of a non-metallic slippery material.

Coupling plate 3 is formed with an insertion slot 20 for a trailer king pin (not shown) affixed to a semi-trailer. Coupling plate 3 is further formed with a pair of flanges 21 extending outwardly on either side of insertion slot 20. Each flange 21 is formed with a leading edge 22, and an upper inclined surface 23. The end of insert slot 20 opposite flanges 21 terminates at a circular hole 24. Hole 24 is formed with a radially extending counterbore forming a step 25 having a horizontal arcuate surface 26, and an annular perimeter wall 27 which is also substantially horseshoe shaped. A plurality of threaded apertures 30 extend through horizontal wall 26 for purposes which will be described in detail below. Hole 24 is formed with an inner surface 31 which is substantially cylindrical except for the portion removed via the communication of hole 24 and insertion slot 20. Additionally, as shown particularly in FIGS. 4, 8 and 10, a flange 32 extends inwardly from inner surface 31, and is formed with a wider section 33, and an axially downwardly extending projection 34. Axially downwardly extending projection 34 engages a recess on the top side of one leg of an approximately U-shaped locking hook (not shown), such as that described in German patent application DE 39 30 187 C2, to prevent the collar ordinarily provided at the lower end of the king pin from engaging the recess of the locking hook when the king pin is moved into insertion slot 2 for coupling the tractor and trailer. A hole 18 is formed in coupling plate 3 to receive a hinge pin (not shown) for the closing hooks which are utilized when the tractor trailer combination is coupled.

In accordance with the present invention, an approximately horseshoe shaped wear ring 37 is mounted within hole 24 adjacent inner surface 31. While horseshoe shaped wear ring 37 may be manufactured of a variety of materials, a self-lubricating plastic is utilized in the preferred embodiment. Wear ring 37 is formed with an inner contour wall 38 which is at least partially semi-circular, an outer contour wall 36 spaced from the inner contour wall 38 and a radially extending step 39 having a horizontal surface 40, and an arcuate vertical wall 41. Inner contour wall 38 and arcuate wall 41 define a projection 42 extending upwardly beyond step 39. Additionally, when wear ring 37 is positioned within hole 24, horizontal surface 40 of step 39 is positioned a short distance below horizontal surface 26 of step 25.

A holding plate 45, having an outer perimeter wall 46 and an inner perimeter wall 47, is complementary shaped to steps 26 and 39 when wear ring 37 is mounted within hole 24. Outer perimeter wall 46 of holding plate 45 is complementary to annular perimeter wall 27, and inner perimeter wall 47 is complementary to arcuate wall 41 of projection 42. A plurality of holes 48 extend through holding plate 45 whereby holes 48 and threaded apertures 30 extending through step 25 are axially aligned and sized to receive fasteners 49.

As discussed above, when wear ring 37 and holding plate 45 are assembled into hole 24 formed in coupling plate 3, a space extends therebetween. This space provides for thermal expansion of wear ring 37 in the axial direction due to the differential thermal expansion coefficient of metal and plastic thus preventing the impartation of an axial load on wear ring 37 by holding plate 45. Wear ring 37 thus remains free of stress as a result of thermal expansion.

Figure 4:
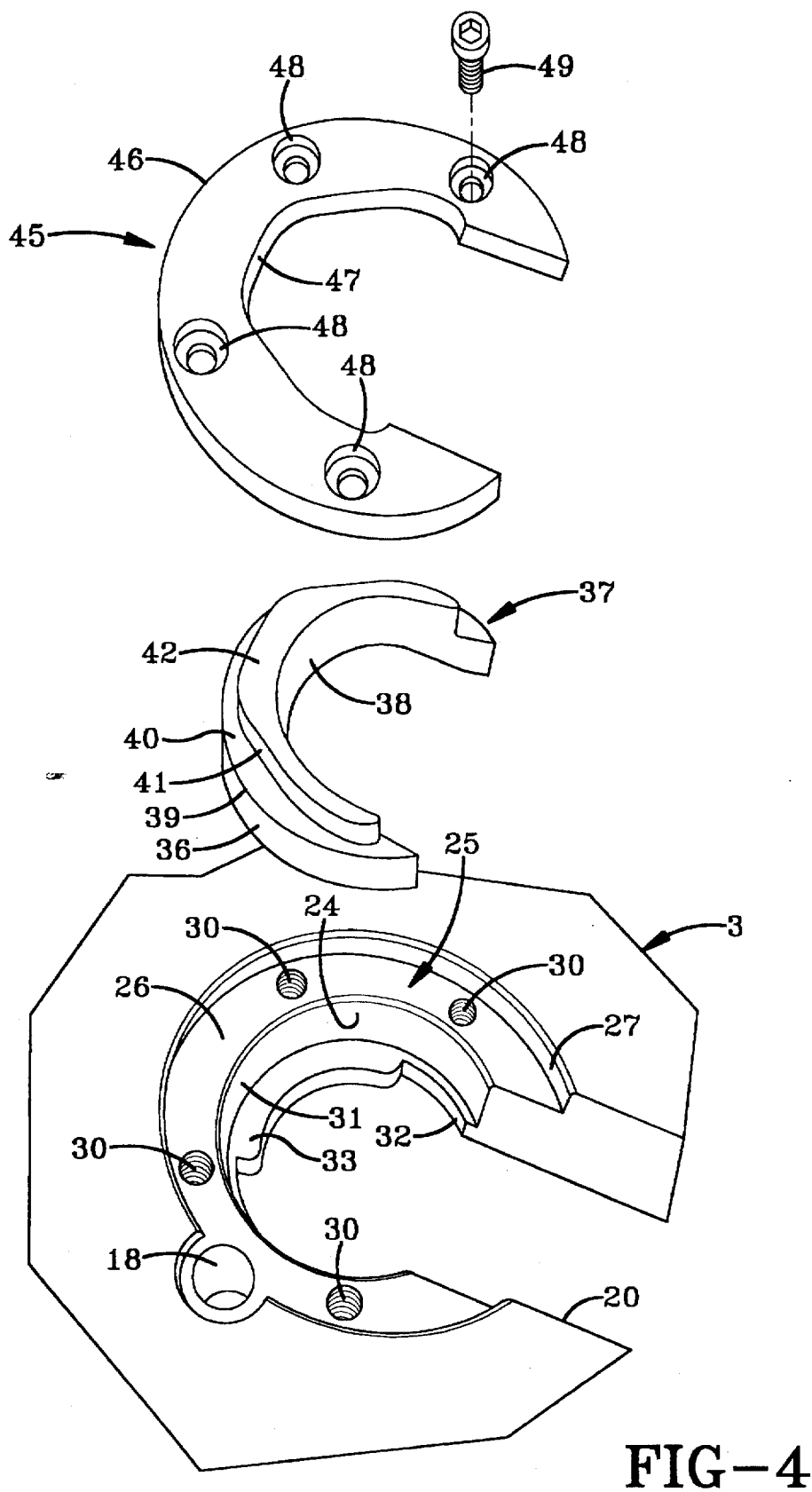
FIG. 4 is an exploded fragmentary perspective view of the fifth wheel shown in FIG. 1.

In accordance with one of the features of the present invention, and referring specifically to FIGS. 4, 6 and 11, outer contour wall 36 of wear ring 37 and inner surface 31 of coupling plate 3 are arcuate, and are formed with the same center of curvature $M_2$. Similarly, outer perimeter wall 46 and annular perimeter wall 27 of step 25 are concentric arcs, and also have a center of curvature coinciding with the center of curvature $M_2$. Conversely, inner contour wall 38 is formed with a center of curvature $M_1$ which coincides to the axis of rotation of the trailer king pin offset from center of curvature $M_2$.

Inasmuch as the axis of rotation of the trailer king pin lies on a center of curvature $M_1$, and outer peripheral wall 46 of holding plate 45 and complementary related annular perimeter wall 27 of coupling plate 3 have a center of curvature $M_2$, offset from the axis of rotation $M_1$ of the trailer king pin, any rotational forces imparted on holding plate 45 via the rotation of the trailer about the king pin relative to the tractor will impart linear rather than rotational forces onto holding plate 45. Specifically, the trailer rotates about the king pin and about the axis of rotation $M_1$, forces imparted on the holding plate will be linearly transmitted through holding plate 45 and into annular perimeter wall 47. Similarly, inasmuch as outer contour wall 36 of wear ring 37 and inner surface 31 share a common center of curvature $M_2$, offset from the axis of rotation $M_1$ of the trailer king pin, rotation of the tractor relative to the trailer about the axis of rotation $M_1$ will impart linear forces onto wear ring 37 rather than rotational forces. As such, the eccentricity of outer contour wall 36 and inner surface 31 relative to the axis of rotation $M_1$, operates to prevent rotation of wear ring 37.

The rotation of wear ring 37 within hole 24 is further prevented via the operative engagement between projection 42 of wear ring 37 and inner perimeter wall 47 of holding plate 45. Arcuate wall 41 of projection 42 and inner perimeter wall 47 are complementary related, each of which is formed with a pair of contours which extend around center point $M_1$ and then further radially outwardly (FIG. 7).

Wear ring 37 is further retained intermediate radially inwardly extending flange 32 and holding plate 45 with holding plate 45 retaining wear ring 37 against axial displacement within hole 24.

Wear ring 37 does not rotate with the trailer king pin. Accordingly, inner contour 38 has a center of curvature $M_1$ which coincides to the axis of rotation of the trailer king pin such that when the trailer king pin rotates, it rotates adjacent a surface having a center of curvature identical to the king pin's axis of rotation thereby substantially extending the life of wear ring 37.

As should be apparent from a review of FIGS. 8–10, wear ring 37 is interposed between flange 32 and holding plate 45 such that there is very little area pressure acting on wear ring 37 in the axial direction by either holding plate 45 or flange 32. Similarly, there is very little radial pressure directed to wear ring 37 from its interaction with holding plate 45. Therefore, wear ring 37 will withstand high clamping forces which are essentially transmitted through holding plate 45, and onto horizontal surface 26 through fasteners 49. Additionally, inasmuch as the center of curvature $M_1$ of inner contour 38 is identical to the center axis of rotation of the king pin, wear ring 37 is resistant to high torques imparted thereto via rotation of the trailer king pin.

Operationally, slip pads 14 are received within respective recesses 6 to assure that when the trailer couples to the tractor, the translational and rotational forces imparted on slip pads 14 will not cause the same to become dislodged from coupling plate 3. Specifically, if extreme translational forces are imparted on slip pads 14, the same will be prevented from deflecting laterally as the slip pads will contact perimeter wall 7.

Further, in order to permit slip pads 14 to expand relative to coupler plate 3 as a result of differences in the coefficient of thermal expansion between plastic and metal, the area of recess 6, is somewhat larger than that required to house slip pad 14. Slip pad 14 may thus expand without imparting stress on the slip pad and avoiding slip pad fracture.

As is also apparent from a review of FIG. 2, given that the material out of which slip pads 14 are manufactured is relatively expensive, only a minimal amount of material has been utilized, such that only the load bearing surface of coupling plate 3 has been provided with slip pad material. Similarly, slip pad material does not extend over inclined surfaces 23 of flanges 21 as the same is not a load bearing area when the tractor and trailer are coupled. Additionally, by positioning the slip pad off of inclined surface 23, incidental contact between the trailer king pin and flanges 21 which may result during tractor and trailer coupling, will not harm slip pads 14, substantially lengthening the life of slip pad 14.

To further avoid damage to slip pads 14, each slip pad is provided with a leading chamfered edge 17 such that when the tractor and trailer are coupling, the trailer coupling plate will slide over chamfered edge 17, and onto slip pads 14.

As is also apparent from a review of FIG. 2, fasteners 16 may take a variety of forms such as screws or pins, but in all cases fasteners 16 are recessed within counterbored holes 15 such that the top surface of each fastener 16 extends substantially below the top surface of slip pad 14.

In summary, a fifth wheel is provided with a wear ring 37 having low pressure loads thereon, and which is inherently resistant to rotation as a result of the offset of the center of curvature of the hole in which the wear ring is received, and the axis of rotation of the trailer king pin. Additionally, a pair of upper slip pads 14 are provided within recesses 6 formed in coupler plate 3 of fifth wheel 1 to substantially reduce the friction between the trailer coupler plate and the fifth wheel plate, and to substantially eliminate the need to interpose grease between the respective coupler plates.

Accordingly, the improved fifth wheel is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved fifth wheel is constructed and used, the characteristics of the construction, and the advantageous, new and useful results obtained; the new and useful structures, devices, elements, arrangements, parts and combinations, are set forth in the appended claims.

We claim:

1. A fifth wheel for coupling a tow vehicle to a trailer having a king pin, comprising:

a saddle;

a coupling plate formed with a pair of flanges, and an insertion slot extending between said flanges mounted to the saddle;

an aperture having an inner surface, operatively associated with the insertion slot and adapted to receive a king pin;

a non-metallic wear ring carried in the aperture and adapted to extend adjacent a trailer king pin and formed with an inner contour wall and an outer contour wall whereby the outer contour wall is complementary related to the inner surface of the aperture with said outer contour wall having a first center of curvature, and the inner contour wall having a second center of curvature offset from the first center of curvature for at least partially preventing the ring from rotating;

a holding plate attached to the coupling plate and extending at least partially over the wear ring for retaining the wear ring against axial displacement; and fastening means for retaining the holding plate to the coupling plate.

2. The fifth wheel as defined in claim 1 in which the holding plate extends radially outwardly of the wear ring.

3. The fifth wheel as defined in claim 2 in which the inner contour wall of the wear ring is at least partially semicircular; in which a counterbore step section extends radially outwardly from the aperture; and in which the holding plate is fitted within said counterbore step.

4. The fifth wheel as defined in claim 3 in which the wear ring includes a radially extending step, and in which the holding plate extending within the radially extending step of the coupling plate, also extends into the radially extending step of the wear ring.

5. The fifth wheel as defined in claim 3 in which the radially extending step of the coupling plate includes a first outer perimeter wall, and in which the holding plate includes a second outer perimeter wall and in which the first and second outer perimeter walls are complementary related, and share the first center of curvature.

6. The fifth wheel as defined in claim 5 in which the second center of curvature is adapted to be coaxial with an axis of rotation of the king pin.

7. The fifth wheel as defined in claim 1 in which the fastening means for retaining the holding plate are screws.

8. The fifth wheel as defined in claim 1 in which the wear ring and holding plate are approximately horseshoe shaped.

9. The fifth wheel as defined in claim 1 in which the wear ring is formed with an axially upwardly extending projection; in which the holding plate is formed with an inner perimeter wall, and in which the upwardly extending projection operatively engages the inner perimeter wall of the holding plate whereby the operative engagement of the axially upwardly extending projection and the inner perimeter of the holding plate at least partially prevents rotation of the wear ring relative to the coupling plate.

10. The fifth wheel as defined in claim 1 in which a radially projecting flange extends inwardly from the aperture, and in which the wear ring is supported on said flange.

11. The fifth wheel as defined in claim 10 in which the radially inwardly projecting flange is formed with a downwardly projecting extension.

12. The fifth wheel as defined in claim 1 in which the holding plate and the wear ring define a void therebetween.

13. The fifth wheel as defined in claim 1 further comprising:

a plurality of arcuate recesses having a recess perimeter formed in the coupling plate each having an upstanding wall extending around the recess perimeter whereby the arcuate recesses correspond to a load bearing zone on said coupling plate and in which the arcuate recess extends at least partially around the coupling plate;

a slip pad positioned within each arcuate recess and covering a majority of the load bearing zone; and fastening means for fastening the slip pads within the recesses.

14. The fifth wheel as defined in claim 13 in which the slip pads are manufactured of non-metallic material, and in which each arcuate recess extends outwardly beyond the associated slip pad by a distance in the range of from ⅛ inch to 5/16 inch.

15. The fifth wheel as defined in claim 14 in which each slip pad is formed with a plurality of counterbored holes in which the fastening means for securing the slip pad to the coupling plate is received within the counterbored holes; and in which the fastener extends below the top surface of the slip pad.

16. The fifth wheel as defined in claim 15 in which each slip pad include a leading edge, and in which the leading edge extends along a flange edge; and in which each leading edge is chamfered.

17. The fifth wheel as defined in claim 16 in which the slip pads provide a forward pair of opposing end walls, and a rearward pair of opposing end walls; and in which said coupling plate extends upwardly between at least one of the pairs of forward opposing end walls and rearward opposing end walls.

* * * * *